United States Patent
Criado et al.

(10) Patent No.: US 9,573,697 B2
(45) Date of Patent: Feb. 21, 2017

(54) ENERGY RECOVERY OF AN AIRCRAFT

(71) Applicant: THE BOEING COMPANY, Chicago, IL (US)

(72) Inventors: Alfredo Criado, Barcelona (ES); Grzegorz M. Kawiecki, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/562,244

(22) Filed: Dec. 5, 2014

(65) Prior Publication Data
US 2015/0307201 A1 Oct. 29, 2015

(30) Foreign Application Priority Data
Nov. 6, 2013 (EP) .................................... 13382449

(51) Int. Cl.
 *B64D 41/00* (2006.01)
 *B64C 23/06* (2006.01)
 (Continued)

(52) U.S. Cl.
 CPC .......... *B64D 41/007* (2013.01); *B64C 23/065* (2013.01); *B64D 41/00* (2013.01); *F03D 1/06* (2013.01);
 (Continued)

(58) Field of Classification Search
 CPC . B64D 41/00; B64D 41/007; B64D 2041/002; B64C 23/065
 See application file for complete search history.

(56) References Cited

U.S. PATENT DOCUMENTS 2,678,785 A * 5/1954 Graham ............... B64D 27/023
 244/113
3,957,229 A * 5/1976 Davis ..................... B64D 35/00
 244/53 R
(Continued)

FOREIGN PATENT DOCUMENTS

EP 2223853 A1 9/2010
FR 2681309 A1 3/1993
(Continued)

OTHER PUBLICATIONS

"Report on the Accident to Boeing 777-236ER, G-YMMM, at London Heathrow Airport on Jan. 2008", UK Air Accidents Investigation Branch, 2010.
(Continued)

*Primary Examiner* — Tien Dinh
*Assistant Examiner* — Richard R Green
(74) *Attorney, Agent, or Firm* — Vista IP Law Group LLP; Cynthia A. Dixon (57) ABSTRACT

An apparatus for energy recovery of an aircraft, an aircraft comprising the apparatus and a method of energy recovery are disclosed. The apparatus comprises a turbine having a body and rotor blades. The turbine is adapted to be mounted to the exterior of an aircraft, such that the body receives an air stream flowing at the exterior of the aircraft. The rotor blades are selectively movable between a stowed position and a deployed position, wherein at the deployed position the rotor blades are rotated by the air stream so as to generate electricity. The blades may be deployed during descent of the aircraft to recover energy normally irretrievably dissipated as the aircraft descends and slows. The blades are stowed when not in use, such as during take-off and cruise.

18 Claims, 9 Drawing Sheets

(51) Int. Cl.
F03D 1/06 (2006.01)
F03D 9/00 (2016.01)

(52) U.S. Cl.
CPC ............... F03D 9/002 (2013.01); F03D 9/10 (2016.05); F03D 13/20 (2016.05); Y02E 10/721 (2013.01); Y02T 50/164 (2013.01); Y02T 50/53 (2013.01)

(56) References Cited

U.S. PATENT DOCUMENTS

| | | | | |
|---|---|---|---|---|
| 3,984,070 | A * | 10/1976 | Patterson, Jr. | B64C 23/065 244/113 |
| 4,533,101 | A | 8/1985 | Patterson, Jr. | |
| 4,950,131 | A * | 8/1990 | Callerio | F03D 7/0236 415/87 |
| 5,085,315 | A * | 2/1992 | Sambell | B64C 27/30 244/17.25 |
| 5,150,859 | A | 9/1992 | Ransick | |
| 5,702,071 | A | 12/1997 | Kroll et al. | |
| 6,928,963 | B2 * | 8/2005 | Karanik | F01P 5/02 123/41.63 |
| 8,708,275 | B2 * | 4/2014 | Belleville | B64D 41/007 244/113 |
| 2010/0170981 | A1 | 7/2010 | Belleville | |

FOREIGN PATENT DOCUMENTS

| | | | | |
|---|---|---|---|---|
| GB | | 645474 A | * 11/1950 | ............. B64D 27/20 |
| GB | | 2461057 A | 12/2009 | |

OTHER PUBLICATIONS

Miranda, L.R., et al., "Aerodynamic Effects of Wingtip-Mounted Propellers and Turbines", American Institute of Aerodynamics and Astronautics, Inc. (AIAA), 86/1802, pp. 221-228, 1986.
Aguilar, A., "BR&T—Europe hosts business students in Spain", available at: http://boeingnews.web.boeing.com/archive/2011/71. html, Jul. 19, 2011.
Extended European Search Report, Patent Application No. 13382449.0-1754, Apr. 28, 2014.
"Boeing 777", Wikipedia, available at: http://en.wikipedia.org/wiki/Boeing_777, accessed on Jul. 18, 2011.
"Gasoline", Wikipedia, available at: http://en.wikipedia.org/wiki/Gasoline#Energy_content_.28High_and_Low_heating_value. 29, accessed at Jul. 18, 2011.
Hastings, et al., "Development and Flight Tests of Vortex-Attenuating Splines", NASA TN D-8083, Dec. 1975.
Waitz, et al., "A Methodology for Integrated Conceptual Design of Aircraft Configuration and Operation to Reduce Environmental Impact", American Institute of Aeronautics and Astronautics, Massachusetts Institute of Technology, 2009.
Patterson, Jr., et al., "Exploratory Wind-Tunnel Investigation of a Wingtip-Mounted Vortex Turbine for Vortex Energy Recovery", NASA Technical Paper 2468, Jun. 1985.
"Pratt & Whitney PW4000", Wikipedia, available at: http://en.wikipedia.org/wiki/Pratt_%26_Whitney_PW4000, accessed on Jul. 18, 2011.
"The Energy Recovery Speed Brake", available at: http://www.airbus-fyi.com/finalists_2011.php, last accessed on 2011.
Leishman J.G., "Principles of Helicopter Aerodynamics", Cambridge, Second Edition, p. 731, 2006.

* cited by examiner

ENERGY RECOVERY OF AN AIRCRAFT

CROSS-REFERENCE TO RELATED APPLICATION

This application claims priority to and the benefit of European Patent Application No. EP 13382449.0, filed on Nov. 6, 2013, the entire disclosure of which is expressly incorporated by reference herein.

FIELD

The present invention relates to a method and apparatus for energy recovery during aircraft flight. In particular, the present invention relates to recovering excess energy during the descent of an aircraft.

BACKGROUND

In the automotive industry, it is known that during braking a portion of the reduction in kinetic energy of the vehicle can be harvested and used to generate electricity. Commonly, there are two ways in which regenerative braking is used. The energy of the slowing vehicle can be transferred to a flywheel and stored there. Alternatively, the kinetic energy can be converted to electrical energy through a motor or generator. The electricity can then be stored in a battery or supercapacitor. If the vehicle is not a car but is instead a tram or train, the electricity can be fed back to the vehicle's traction power supply such as overhead power line.

Such systems provide increased efficiency and reduced fuel costs. There is little in the way of such technologies for aircraft.

One known system for generating electricity from the movement of an aircraft is a ram air turbine (or RAT), such as disclosed in GB 2461057. The ram air turbine is a turbine mounted and stored within a compartment of the aircraft. The turbine can be deployed from the compartment by opening a door and swinging the turbine out into the airstream to generate electrical power. Such ram air turbines are deployed in the event of an emergency to provide a back-up source of electrical power. For example, an emergency might be when the main engines or auxiliary power unit of the aircraft fails.

Figure 1A:
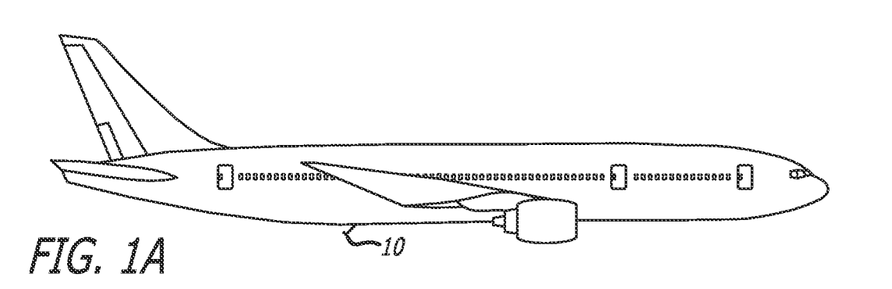
FIGS. 1a-1c are schematic diagrams of a ram air turbine of the prior art, including in FIG. 1a its deployment below the fuselage of an aircraft and in FIGS. 1b and 1c it is shown respectively deployed from and stowed in a compartment.
Figure 1B:
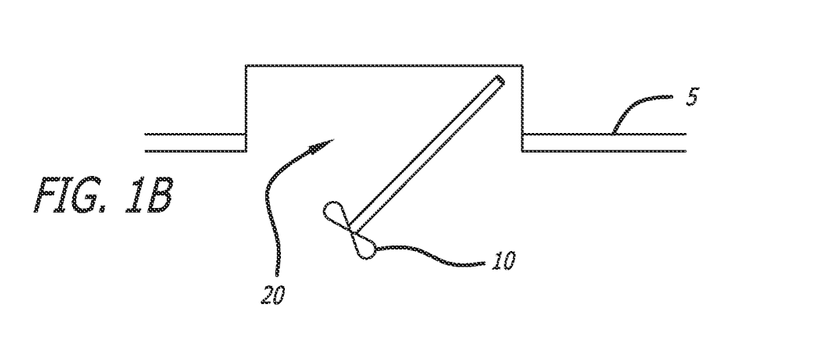
Figure 1C:
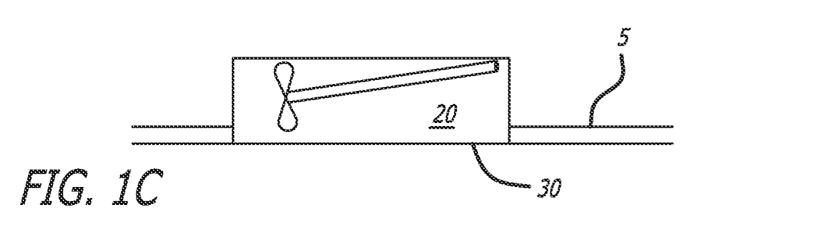

A ram air turbine is shown in FIGS. 1a-1c. FIG. 1a shows the general location of a ram air turbine 10 at the underside of the aircraft fuselage. FIG. 1b shows more detail of how the ram air turbine is deployed from a compartment 20 in the fuselage. FIG. 1c shows the ram air turbine stowed in the compartment 20. In the event of a loss of electrical power, the ram air turbine 20 is deployed by opening a compartment door 30 and swinging the turbine out beyond the skin of the aircraft 5 into the airstream flowing past the aircraft. The airstream rotates the blades of the turbine which drives a generator of the turbine to generate electrical energy. When not in use, such as during normal flight where electrical power is provided by the main engines or auxiliary power unit, the turbine 20 is stowed in the compartment 20 and the compartment door 30 is closed. In the stowed position the turbine is not in the airstream, the blades do not turn and no power is generated by it.

Other attempts have been made to recover energy from the movement of an air vehicle. For example, an energy recovery speed brake has been proposed (see www.airbus-fyi.com/finalists_2011.php) for inclusion in the wing. The speed brake would be a turbine placed between the wing surface and a conventional air brake. However, the small size and location of the speed brake limits the amount of energy that can be generated.

There is therefore a need for an improved method and apparatus for recovering energy from the movement of an aircraft.

SUMMARY

The present invention provides an apparatus for energy recovery of an aircraft, an aircraft comprising the apparatus for energy recovery, and a method of energy recovery of an aircraft.

The apparatus comprises a turbine having a body adapted to be mounted to an aircraft, so as to receive an air stream flowing at the exterior of the aircraft. The turbine is adapted for mounting to the aircraft such that the body is located at the exterior of the aircraft. The turbine is similar to a wind turbine. The turbine has rotor blades movable between a stowed position and a deployed position. The blades are selectively deployable between the positions, wherein at the deployed position the rotor blades are rotated by the air stream so as to generate electricity. The stowable rotor blades allow the turbine to be mounted externally to the aircraft for long term or continuous use. By stowing the rotor blades when not in use, the aerodynamic drag is significantly reduced so as to be comparable to the aircraft without the turbine.

The present invention differs from a ram air turbine (RAT) in that RATs are deployed in an emergency only, for example when the main power plant fails. When not in use the RAT, including the body and blades, is wholly stowed within a compartment in the fuselage of the aircraft, and when required the compartment opens and the turbine swings out into the airstream. Conversely, in the present invention, the turbine is installed for receiving the airstream during all phases of flight but when not in use the rotor blades only are stowed. To achieve this, the rotor blades can be folded at their base and with respect to the body so that the rotor blades are not driven by the airstream.

The stowed position may be more aerodynamically efficient for the aircraft than the deployed position. The stowed position is preferably used during take-off, at least, and possibly also during cruise.

The stowed position can be achieved in a number of alternative ways. Firstly, in the stowed position the rotor blades may be hidden from the airstream by a fairing. Secondly, in the stowed position the rotor blades may be folded from the airstream so that the rotor blades and body together form a fairing. The rotor blades are preferably folded back, but could also be folded forwards. In these latter configurations, the rotor blades may be folded flat in parallel to the body, or point towards each to form a gradually tapering fairing. These ways of stowing the blades maybe used in combination, and other methods of stowing may be used instead of in combination with these methods.

The number of rotor blades per turbine is at least two, but is preferably three or four. A single blade refers to the portion from tip to central hub or rotation axis. The minimum of two blades would be arranged opposed across a diameter of the rotor. Other numbers of blades would be arranged at equidistant angles around the rotation axis.

The apparatus may further comprise a controller for communication with the turbine and configured to control deployment of the rotor blades during flight of the aircraft. The controller may be further configured to initiate deployment of the rotor blades during descent of the aircraft and to instruct stowing of the rotor blades during take-off and/or cruise.

The rotor blades may have a variable pitch for adjusting the drag on the aircraft and the amount of energy recovered. The pitch is the angle the rotor blades make with the rotor axis. The pitch is variable so as to adjust the generated air resistance. This can be used for controlling the descent of the aircraft in the same way as conventional aerodynamic brakes. RATs do not have the ability to adjust the drag so cannot be used for controlling the descent of the aircraft.

The controller may be further configured to control the pitch of the rotor blades when recovering energy so as to control the amount of drag and energy recovered.

The turbine may be mounted on a wing or tail assembly of the aircraft, for example at a wingtip.

The radial length R of the rotor blades in the deployed position and the wingspan b of the aircraft may be selected so that the turbine produces more energy through its rotation than it dissipates through the resulting drag. The radial length R of the rotor blades in the deployed position and the wingspan b of the aircraft maybe given by R>0.07b/4.

This ratio is best employed when the turbine is mounted at the wingtip so as to benefit from the extra energy of wingtip vortices.

The turbine may be mounted to the aircraft through a rotatable coupling such that the orientation of the rotor axis of the turbine is adjustable with respect to the aircraft. This adjustment is so that the turbine axis can be aligned with the airstream, for example to compensate for the angle of attack of the aircraft if the nose is pointed up. To accommodate both crosswinds and aircraft angle of attack the rotatable coupling may include two axes of rotation.

The aircraft according to the present invention comprises the apparatus described above, and may further comprise an electrical distribution network connected to the turbine to receive energy generated from the turbine, the aircraft further comprising energy storage devices for storing the recovered energy.

The method according to the present invention comprises flying the aircraft and moving rotor blades of the turbine from a stowed position to a deployed position such that in the deployed position the rotor blades are rotated by the airstream so as to generate electricity.

The method may further comprise adjusting the pitch of the rotor blades to set the amount of drag. The rotor blades may be used as an aerodynamic brake such as to slow the aircraft during descent.

The rotor blades of the turbine may be moved to a deployed position for a descent phase of flight, but stowed into a retracted position during other phases of flight where drag is required to be less. The use of the rotor blades as an aerodynamic brake may replace some conventional aerodynamic brakes on the aircraft.

The turbine may additionally replace a conventional ram air turbine (RAT) which is provided for back-up power supply in an emergency.

The present invention also provides a system for energy recovery in aircraft descent, comprising: at least one turbine mounted for continuous reception of an airstream; energy conversion equipment; and electrical distribution equipment, wherein the turbine comprises a plurality or stowable rotor blades, a rotating hub and a fairing.

DRAWINGS

Embodiments of the present invention, along with aspects of the prior art, will now be described with reference to the accompanying drawings, of which.

DESCRIPTION

During the period from 2004-2011, the cost of jet fuel doubled. Over this time, the proportion of an airline's operating costs due to fuel has grown to around 30%. The present invention is directed to reducing fuel burn by recovering energy from the kinetic and potential energy of an aircraft in flight. Generally, deployed systems will add to the drag of the aircraft and therefore may not significantly increase overall efficiency. The present invention is directed to reducing the large amounts of energy wasted as an aircraft descends from cruise to land. During cruise, the aircraft is at high altitude and travelling at high speed. As the aircraft descends, such as for landing, the aircraft must lose height and also reduce its speed. The sum of kinetic and potential energy (with respect to the destination airport) at cruise is far in excess of the sum of kinetic and potential energies just before landing. Only a small portion of this energy is dissipated through intrinsic drag of the aircraft. That is, for an aircraft in a "clean-configuration" with no drag inducing devices deployed, such as flaps or landing gear, only a small part of the dissipated energy is through drag. The remaining portion is irreversibly dissipated through the deployment of the drag inducing devices. The landing gear and flaps are deployed at the final, low velocity phase of a typical descent and therefore their contribution to energy dissipation is limited. For example, the landing gear is down during only the last 2-3 minutes before touchdown. At this point, the average velocity of the aircraft is about 125 kts. The flaps are activated during the last nine minutes or so of a forty minute long descent at an average speed of 150 kts. The deployment of the landing gear is a necessary condition of a safe landing and cannot be avoided, but the process of slowing down the aircraft through the use of aerodynamic brakes results in an irreversible dissipation of energy. This energy was previously generated by burning fuel during take-off, ascent and cruise flight phases.

Figure 2:
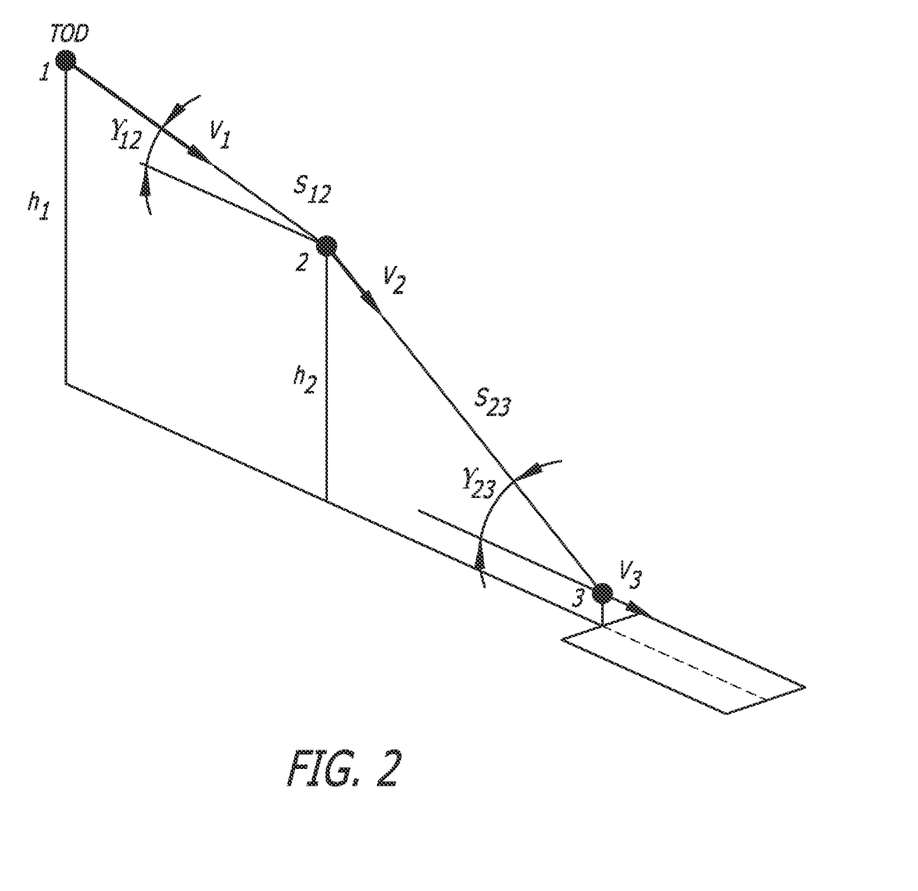
FIG. 2 is a schematic diagram of the descent of an aircraft from top of descent (TOD) to an airport.

FIG. 2 shows schematically the descent phase of an aircraft. This in combination with FIGS. 3 and 4 allows us to assess the amount of energy dissipated during descent, and an equivalent mass of fuel that the energy corresponds to.

In FIG. 2, "TOD" marks the top of the descent phase from a cruise altitude. The descent up until just before landing is divided into two phases of constant deceleration and constant angle of descent. In the first phase, the path S12 runs from point 1 at height h1 to point 2 at height h2. Along S12, the assumed constant descent angle is given by γ12. The velocity along S12 is variable and decreasing according to the constant deceleration. In the second phase of descent, the path S23 runs from point 2 at height h2 to point 3 at height h3, which is the airport altitude. By measuring heights h1, h2 and h3 from the airport altitude, the airport altitude h3 can be taken as zero height. Along S23, the assumed constant descent angle is given by γ23. The velocity along S23 is variable and decreasing according to the constant deceleration for the second phase.

Typical figures are given in Table 1 for velocities and heights at three points 1, 2 and 3 such as in FIG. 2.

TABLE 1

Velocity and Heights in Descent for a typical passenger jet aircraft.

| Velocity at points 1, 2, 3 | | Height at point 1, 2, 3 | |
|---|---|---|---|
| v1 | 251 m/s (905 km/h) | h1 | 10700 m (35000 ft) |
| v2 | 129 m/s (250 kts) | h2 | 3050 m (10000 ft) |
| v3 | 82.3 m/s (160 kts) | h3 | 0 m (0 ft) |

The values at point 1 are the cruise altitude and speed. The values at point 2 provide the cruise speed at a height of 10000 ft. The values at point 3 are the values at airport height and landing velocity. The mass of a typical passenger jet aircraft used for this proof-of-concept calculation has been estimated as 200,000 kg.

Using the values in the table above the total energy of the aircraft at the top of the descent TOD and the total energy just before touch down can be estimated. A second estimate is made of the total energy that can be dissipated during descent with a clean aerodynamic configuration (with no drag inducing devices deployed), except until the final stages when flaps and landing gear are deployed. A 20% energy dissipation can be assumed through the air resistance of the landing gear and flaps.

Figure 3:
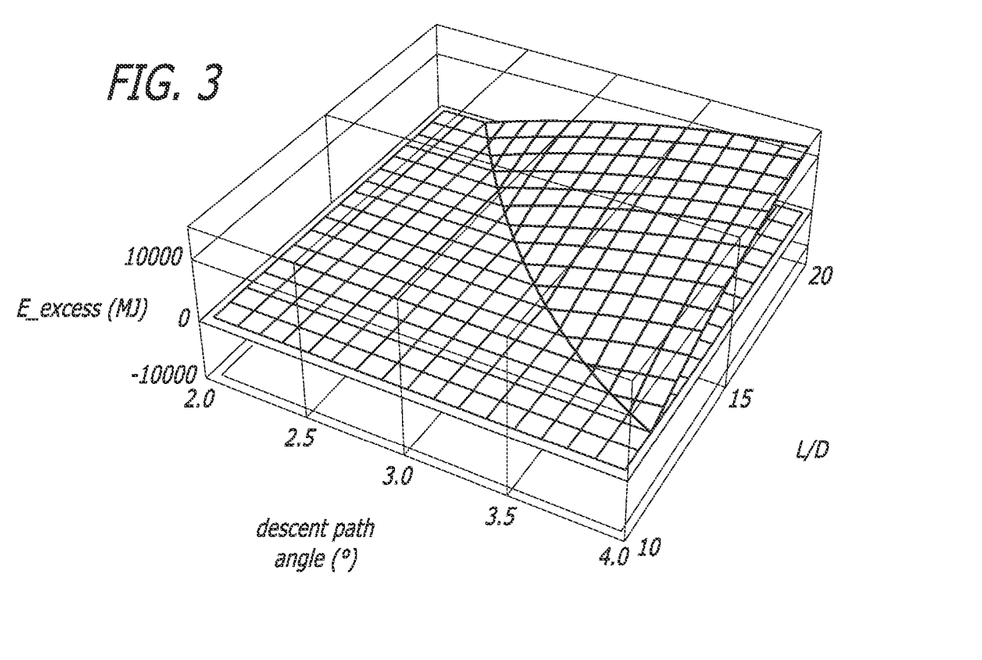
FIG. 3 is a graph showing excess energy E_excess for an aircraft in descent against lift-to-drag ratio L/D and descent path angle γ.
Figure 4:
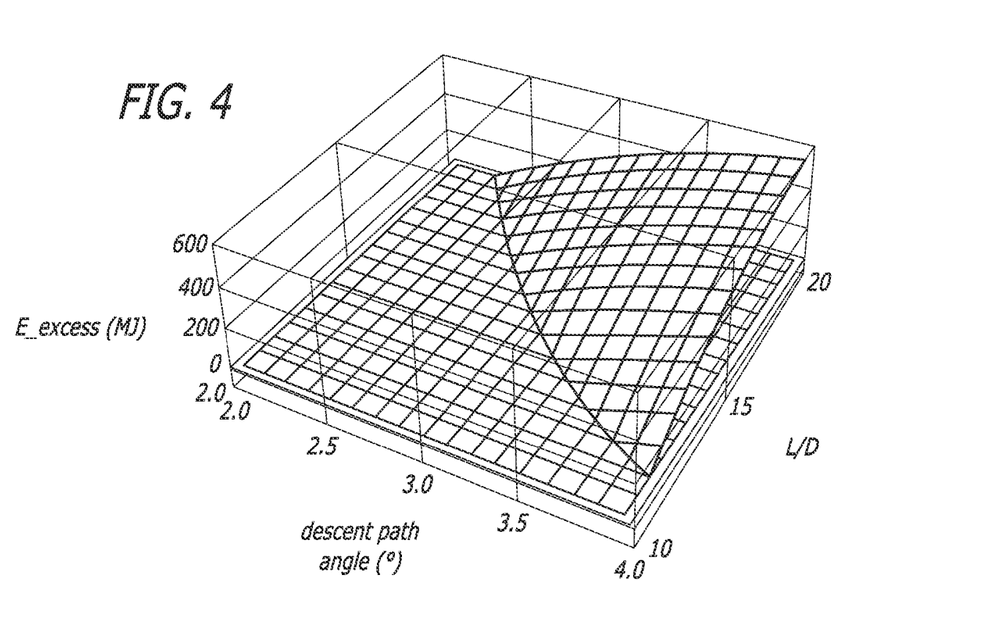
FIG. 4 is a graph showing the excess energy in terms of fuel equivalence for an aircraft in descent against lift-to-drag ratio L/D and descent path angle γ.

If the total energy at TOD exceeds the sum of the total energy just before touch down and energy dissipated through the aerodynamic resistance of the aircraft configured for landing, then aerodynamic resistance alone is not sufficient to result in the required reduction in energy, and air speed brakes must be used to irreversibly dissipate the excess energy. The energy content of aviation fuel is 44 MJ/kg. We also assume a 50% efficiency for turbofan engines. The excess energy E_excess can be calculated as a function of descent angle γ and lift-to-drag ratio L/D. FIG. 3 is a graph showing the amount of energy that needs to be dissipated irreversibly using speed brakes as a function of descent angle γ and lift-to-drag ratio L/D. In FIG. 4, this energy value is converted to an equivalent mass of jet fuel.

FIG. 3 shows a flat surface which represents E_excess=0. The curved surface rising above the E_excess=0 plane shows the amount of energy to be dissipated. For example, for an aircraft with a lift-to-drag ratio L/D of 20 descending at 4°, the aerodynamic brakes would have to dissipate about 9200 MJ of energy. This is equivalent to about 420 kg of fuel as shown in FIG. 4.

Table 2 provides values for energy to be dissipated at other descent angles γ and lift-to-drag ratio L/D in terms of a mass of jet fuel.

TABLE 2

Energy to be dissipated at descent angles γ and lift-to-drag ratio L/D in terms of a mass of jet fuel (kg).

| | Descent angle γ = 3° | Descent angle γ = 4° |
|---|---|---|
| L/D = 18 | 157 kg | 358 kg |
| L/D = 20 | 238 kg | 419 kg |

Typically, the average descent angle in the initial phase of descent is about 4°, whereas in the final descent phase it is about 2.5°. In future, slightly larger descent angles may be used to reduce fuel consumption and noise levels as requirements become more stringent.

Given the above, an object of the present invention is to recover a portion of the dissipated energy with the aim of reducing fuel burn.

Figure 5:
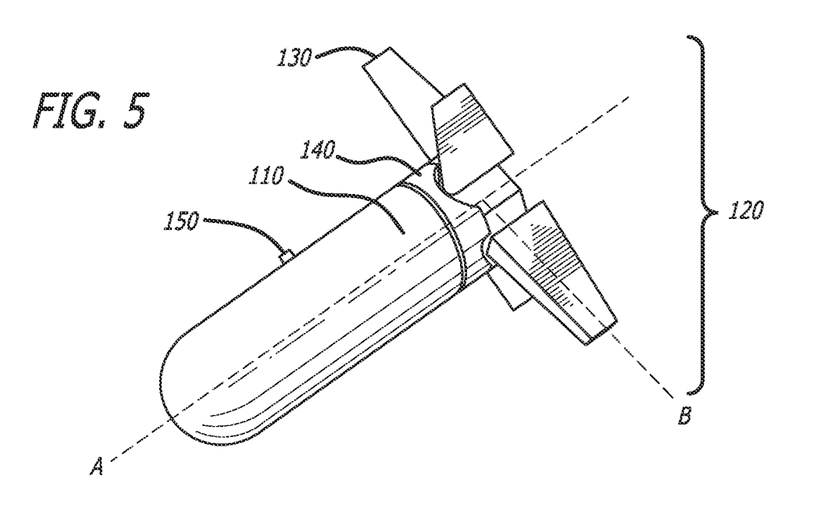
FIG. 5 is a perspective conceptual diagram of a turbine according to an embodiment of the present invention, with rotor blades deployed.

FIG. 5 shows an embodiment of the present invention, which comprises a turbine having a rotor 120, which is rotated as the aircraft moves through the airstream. The mechanical energy of rotation is converted to electrical energy by a generator. FIG. 8 shows the turbines located at one or more locations about the aircraft.

The turbines are arranged to convert the energy of the air-flow to energy that can be re-used. For example, the generated electrical energy can be supplied directly into the aircraft electrical system for powering systems normally powered by the main engines or auxiliary power unit. Alternatively, or in combination, the generated electrical energy can be stored in a battery or other energy storage devices for later use.

As shown in FIG. 5, the turbine comprises a body 110 and rotor 120. The rotor 120 comprises blades 130 mounted to a rotatable hub 140. The body 110 may comprise some or all of the instrumentation and generator for energy conversion. As shown in FIG. 8 the turbine(s) may be fixed to the aircraft at one or more locations. In one embodiment, the body 110 is fixed to the aircraft by a rotatable coupling that allows the body of the turbine to alter its angular orientation with respect to the aircraft. This allows the turbine to align its orientation with respect to the airstream, such as for maximum energy recovery or for a required drag value. As shown in FIG. 5 the rotatable coupling 150 may be by pin, a drum or axle.

The rotatable hub 140 forming part of the rotor 120 is preferably coupled to a generator inside the body. However, alternative arrangements are possible in which the generator is inside the rotatable hub, or the generator is in the aircraft itself, such as in a wing, tail plane or fuselage.

The rotor blades 130 may be rotatably coupled to the rotatable hub such that the pitch of the blades can be varied, such as for adjusting aerodynamic drag.

Figure 6:
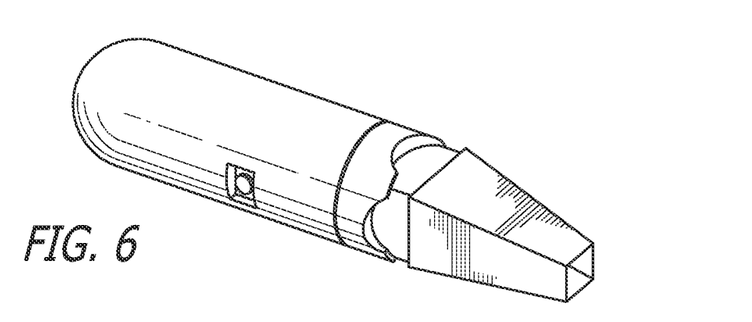
FIG. 6 is a perspective conceptual diagram of a turbine according FIG. 5, with rotor blades stowed.

As well as the rotor blades 130 having variable pitch, they can also be stowed to minimize drag when not in use. As shown in FIG. 5, in use the plane of each rotor blade is normal to the body 110 and/or hub 140, with the pitch angle of the plane of the rotor blade setting the proportion of energy extracted from the air stream and/or the associated drag. In FIG. 6, the blades are folded back and energy is not extracted from the airstream. The rotor blades are folded back in the stowed position such that together the rotor blades form a further part of the fairing, for example a rear tapering fairing of the pod. In this way, the rotor blades are folded back in a similar manner to closed petals forming a flower bud. Only one side of each rotor blade receives the airflow. The other is hidden inside. The edges of the rotor blades meet each other to form the fairing like arrangement.

To achieve the variable pitch shown in FIG. 5, the rotor blades 130 each have a rotatable coupling to the hub 140. This rotation can be considered to be about a first axis B for each rotor blade. The axis of rotation is orthogonal to the axis A of the body of the turbine. For stowing of the rotor blades as in FIG. 6, each blade has a second rotatable coupling or the rotatable coupling for pitch is adapted for rotation about a second axis. The axis for stowing is in a circumferential or tangential direction.

Figure 7:
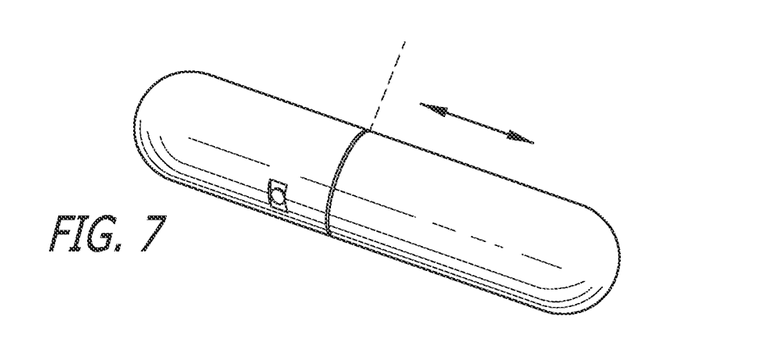
FIG. 7 is a perspective diagram for a turbine according to an alternative embodiment of the present invention, with rotor blades stowed behind a fairing.

FIG. 7 shows an alternative arrangement of fairing and rotor blades. In this arrangement, the blades are folded flat in a similar manner to FIG. 6, but they are then covered by a movable fairing that slides over the folded rotor blades. When in use the movable fairing may divide along its length and slide over the fixed portion of the body, or it may slide backwards behind the deployed rotor blades and rotating hub. Other arrangements of movable fairing are possible that cover the stowed rotor blades when not in use.

Although the figures show the body having a pod-shaped fairing, other shape are possible. Such shapes may have reduced cross-section and improved streamlining.

Figure 8A:
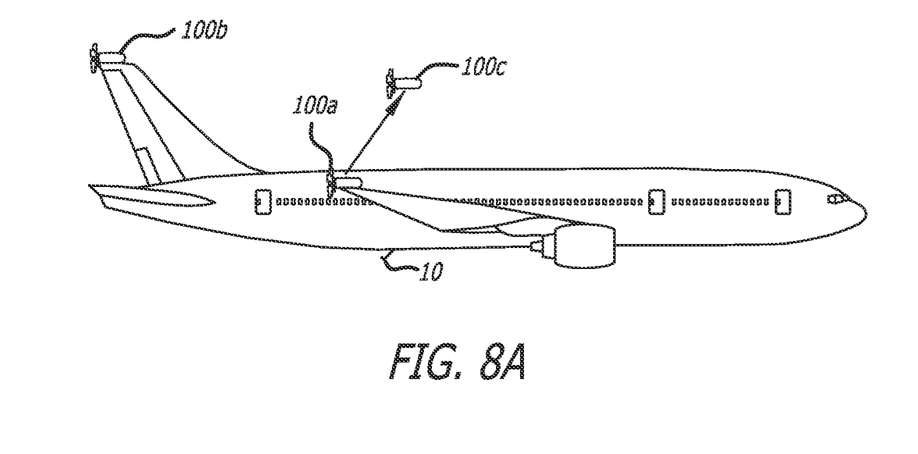
FIGS. 8a and 8b are diagrams showing the locations and orientability of turbines according to the present invention.
Figure 8B:
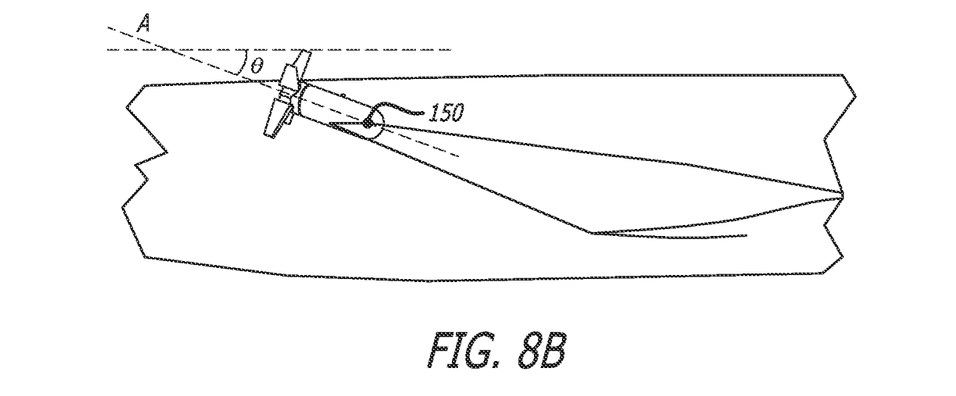

One or more turbines 100a, 100b may be provided on an aircraft. FIGS. 8a and 8b show some examples of locations for such turbines. FIG. 8a shows a turbine 100a located at a wing tip. If located in this way a second turbine would be correspondingly located on the tip of the other wingtip (not shown in FIG. 8a). A turbine 100b may be mounted at the tail section of the aircraft, as also shown in FIG. 8a. This may be in addition to at the wings or instead of at the wings. The location of the turbine at the tail is preferred to be at the top of the vertical tail. Location at the base of the vertical tail is not optimal because of the proximity to the ground during landing flare and because the exhaust of the auxiliary power unit is often located there.

FIG. 8a schematically shows a 3 meter diameter wingtip installed turbine 100a at the wingtip. For comparison, a standard ram air turbine 10 is shown. The approximate scaling in FIG. 8a is appropriate for a typical wide-body airliner. Instead of the 3 meter diameter turbine 100a, a smaller 1 meter diameter could be installed at the wing tip. The approximate size of this is shown for comparison as 100c in FIG. 8a. The advantages of the smaller and larger sizes are discussed below. Other sizes of turbine may also be used. The size of the vertical tail installed turbine 100b is 1.4 meters in diameter.

The larger, 3 meter diameter, turbine at the wingtip receives additional benefit from wing tip vortices. These will also be discussed below.

FIG. 8b shows how the pin 150 may be used to set the orientation of the turbine relative to the aircraft. In the example of FIG. 8b, the turbine is located at the tip of a wing, although adjustment and setting of the turbine orientation is applicable wherever the turbine is located on the aircraft. The pin 150 permits the orientation angle θ of the body of the turbine to set relative to the central axis of the aircraft, namely that of the fuselage from nose to tail. This ability to orient permits the turbine body and hence, rotor blades, to be oriented more closely to the airstream, for example head-on into the airstream. The ability to rotate and set the angular orientation of the turbine to the airstream is adapted for setting the vertical angular orientation, such as when the nose of the aircraft is pointed downwards but the airstream flows horizontally.

The turbine is adapted for mounting to the aircraft such that the body receives the air stream flowing at the exterior of the aircraft during all phases of flight. The turbine is mounted externally.

Figure 9:
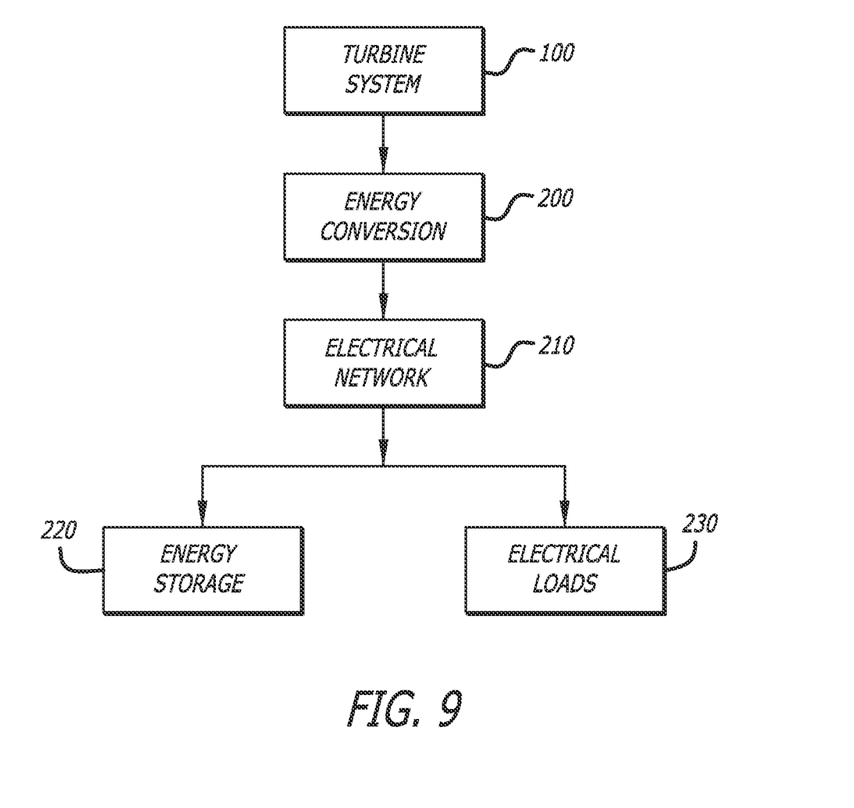
FIG. 9 is a block diagram showing the components of an energy recovery system according to the present invention.

The energy recovered may be either immediately reused on board, stored, or both. FIG. 9 is a schematic diagram of the electrical system of an aircraft in which the turbine may be provided. The electrical system includes turbine system 100, which includes the rotor blades, which convert the energy from the airstream to mechanical energy in rotation of the blades. The blades drive a generator, which may be coupled to an inverter or converter. The generator produces electricity, which is converted by the energy conversion unit 200 to the desired voltage and frequency for the aircraft. Aircraft electrical network 210 supplies the electrical energy to aircraft systems in a similar manner to a conventional network powered by the auxiliary power unit. Electrical loads 230 consume energy from the electrical network. These loads might be anything from power for hydraulic systems, to cockpit systems and in-flight entertainment. Excess energy is stored in energy storage devices 220 such as batteries and capacitors, and supplied to the electrical network when required.

As discussed above there is likely to be excess energy when an aircraft descends, such as moving from cruise to final-approach and landing. Conventionally, this excess energy is dissipated through the deployment of flaps, landing gear and aerodynamic/speed brakes and is lost. The present invention aims to reduce the irreversible loss of energy during descent of the aircraft. We have mentioned above that a typical passenger jet may need to dissipate as much as 9200 MJ of energy. The amount of energy to dissipate strongly depends on the aerodynamic efficiency of the aircraft and on the descent path. This energy may, or may not be, completely dissipated through the drag of the aircraft combined with the drag of flaps and landing gear deployed before landing. In general, the better the aerodynamic efficiency and the steeper the path, the more energy needs to be dissipated. For example, a commercial jet with aerodynamic efficiency of L/D=20, descending at 3.0 deg would need to dissipate about 5400 MJ of excess energy, assuming that the deployment of flaps and landing gear reduces its L/D in the second phase of descent by 20%. The energy to be dissipated can be represented by the equation:

$$E\_excess = E\_kinetic@TOD + E\_potential@TOD - E\_kinetic@touchdown - E\_aerodrag \quad \text{Equation 1}$$

At least some of the energy may be absorbed by a turbine device, similar to a wind turbine. The power and thrust extracted from wind by a wind turbine are given by the coefficients CP and CT respectively. The maximum possible values for these are CP=16/27 and CT=8/9. It is not possible to extract all of the energy from wind because this would mean that after flowing through the turbine, the wind would have zero velocity and so incoming wind could not also flow through.

The radius R of a rotor needed to absorb a given excess energy over a given descent time is given by $$\tfrac{1}{2}\pi R^2 \int_0^{t13} \rho(t)\cdot[v(t)]^3 dt (CP+CT) = E\_excess \qquad \text{Equation 2}$$

where $\rho(t)$ is the air density as a function of height, which varies with time during descent, v is the airspeed, and t13 is the time of descent (see FIG. 2).

The analysis has been performed for a typical passenger jet aircraft. The analysis indicates that the excess energy could be absorbed by a rotor with a radius of 0.7 meters or two rotors with a radius of 0.5 meters each. These radii correspond to rotor blade lengths. Of course, other radii and numbers of rotors or turbines could be used. Of the available energy, about 40% could be converted to rotational energy and the remainder irreversibly dissipated due to rotor thrust. The turbine would work as a speed brake able to absorb a significant portion of the excess energy for re-use.

Figure 10A:
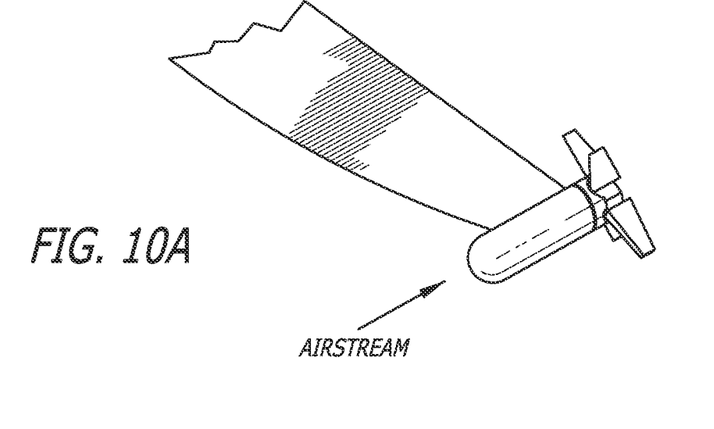
FIGS. 10a-10c are diagrams respectively showing an airstream arriving at a turbine, the additional rotational effect provided by a wingtip vortex, and the vector sum of the airstream and vortex components.
Figure 10B:
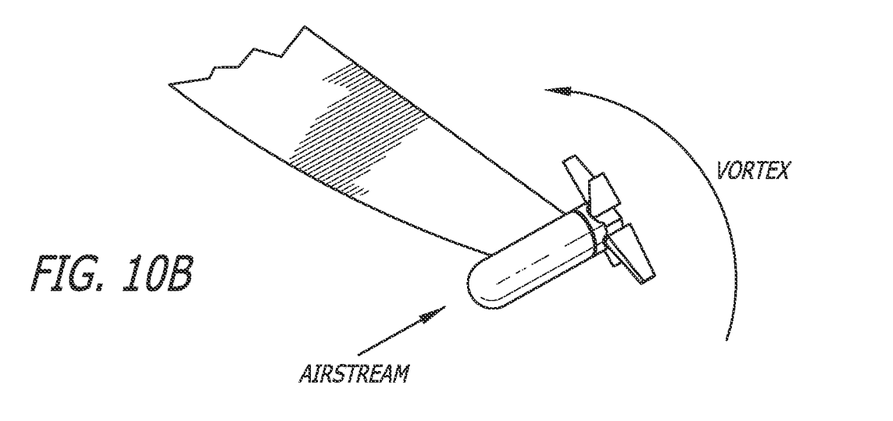
Figure 10C:
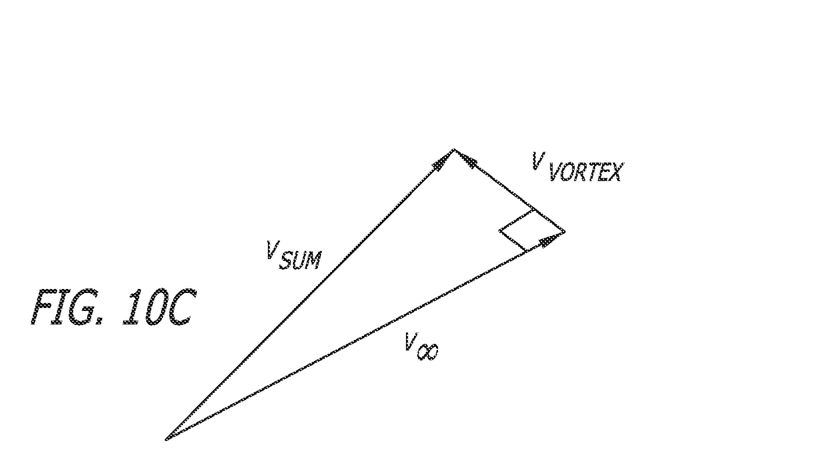
Figure 11:
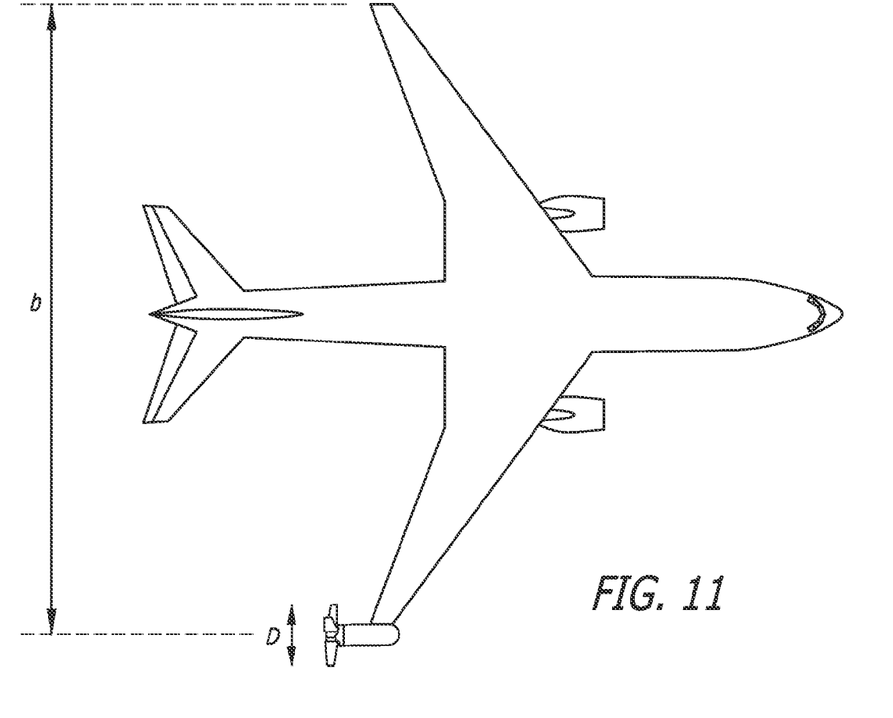
FIG. 11 is a plan view of an aircraft with a wingtip mounted turbine showing the aircraft wingspan and turbine diameter.
Figure 12:
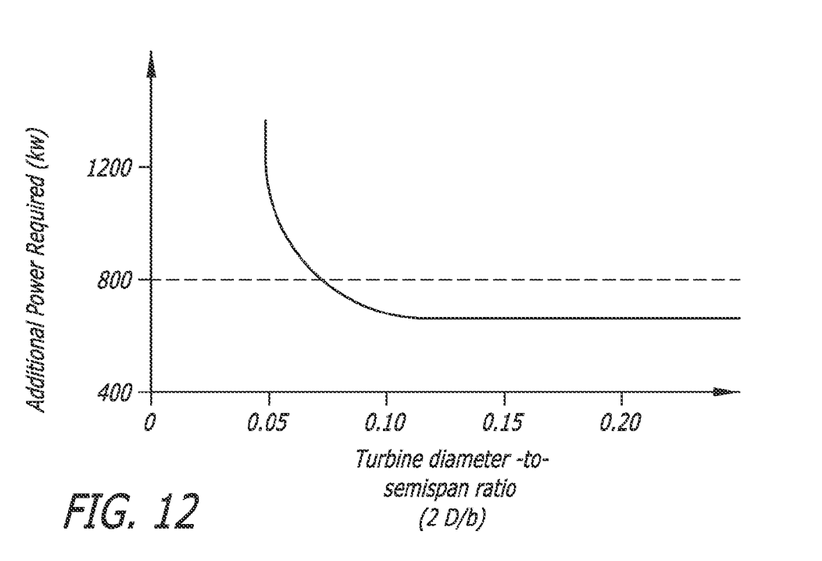
FIG. 12 is a graph showing the increase in energy recovered as the turbine diameter to semi-span ratio increases.

The performance can be improved if the rotor makes use of vortices occurring at wingtips. Such wingtip vortices are helicoidal patterns of air formed from the tip of the wing as it generates lift. The vortex applies an additional velocity component that modifies the inflow angle of the airstream to the rotor blade. FIG. 10a shows a wingtip mounted turbine such that the rotor blades are at, or behind, the trailing edge of the wing. If there is no wingtip vortex, the airstream approaches from approximately directly in front of the turbine. (Here we are ignoring the angle of attack, which might influence the actual airstream direction.) In FIG. 10b, a wing tip vortex is present. The circular component is added to the linear component of the airstream from in front of the wing. FIG. 10c shows that the vector sum Vsum of the vortex Vvortex and airstream $V_\infty$ velocities results in a modified inflow direction seen by the rotor blade. If the turbine is arranged such that its rotor rotates in the same direction as the wing tip vortex, the amount of power generated will increase compared to the linear airstream of FIG. 10a. Studies have shown (see AIAA Paper 86-1802 by Miranda L. R. and Brennan J. E., 1986, "Aerodynamic Effects of Wingtip Mounted Propellers and Turbines") that if the ratio of the diameter of the turbine rotor to the aircraft semi-span (2D/b), as illustrated in FIGS. 11 and 12, exceeds 0.07 then the turbine output power is greater than the additional power required to be provided to the aircraft to overcome drag of the turbine. FIG. 12 takes an example of aiming to generate 800 kW from the turbine and calculates the amount of extra energy required to be provided to the aircraft. Beyond a 2D/b ratio of about 0.10, the turbine output power is greater by about 15%. The level does not increase further for larger turbine diameters. These calculations mean that for the case of a wingtip vortex and an appropriate 2D/b ratio the turbine would generate more energy than it would appear to extract from drag in a linear airstream alone. For a typical commercial aircraft, a rotor diameter corresponding to around 3 meters would meet this condition. In the above discussions, we mention the possibilities for sizing of the turbine. Turbine rotor diameters of 3 meters and 1 meter are mentioned for the wing tip. The 3 meter variant would have additional benefit in generating more energy than is extracted due to drag during descent, due to the additional velocity component provided by the wingtip vortex. The 1 meter variant would not receive this extra benefit.

The rotation direction of the vortices differs between the wings on each side of the plane. Hence, if the turbines are mounted on wingtips they will be counter-rotating. When viewed from a downstream position (e.g. behind the aircraft) the left turbine rotates in a clockwise direction and the right turbine rotates in an anti-clockwise direction.

The use of wingtip mounted turbines has advantages in addition to energy generation, because they reduce the strength of vortices shed from the wingtips. This means that after an aircraft has passed along a runway or through a particular airspace, the time required for the vortices to subside is less. As a result, it makes it possible to increase airport throughput. The wingtip mounted turbines also reduce the need to install winglets for reducing vortices.

Previous studies by Hastings etc al. in NASA Technical Note D-8083, "Development and Flight Tests of Vortex-Attenuating Splines", 1975, have shown that wingtip mounted fixed splines of diameters comparable to those required here provide no aircraft handling problems. Hence, rotating turbine blades should also pose no handling problems.

The turbine could also be used in place of a ram air turbine (RAT) to provide back-up power supply if needed. Thus, any additional weight added by incorporating the turbines would be at least partly, and possibly fully, negated by removing the need for a ram air turbine. Conventional ram air turbines (RATs) are designed for occasional emergency use rather than continuous use or use on every descent. The present invention is for systematic energy recovery preferably in every flight or during every descent.

The turbine has been described above for use on a passenger jet, but the invention is not limited to this. The invention could be applied to other types of manned aircraft, as well as unmanned air vehicles (UAVs), which have a high cruise altitude.

The present invention provides a solution to recovering energy which permits management of the entire excess energy, unlike the prior art recovery speed brake concept between flap and wing. The turbine arrangement and method is particularly suited for deployment during descent because of the additional energy generated, but could also be used during the entire flight, or during cruise and descent. Extended use during the entire flight or cruise and descent may be especially appropriate for wingtip mounted devices where extra energy is available.

Figure 13:
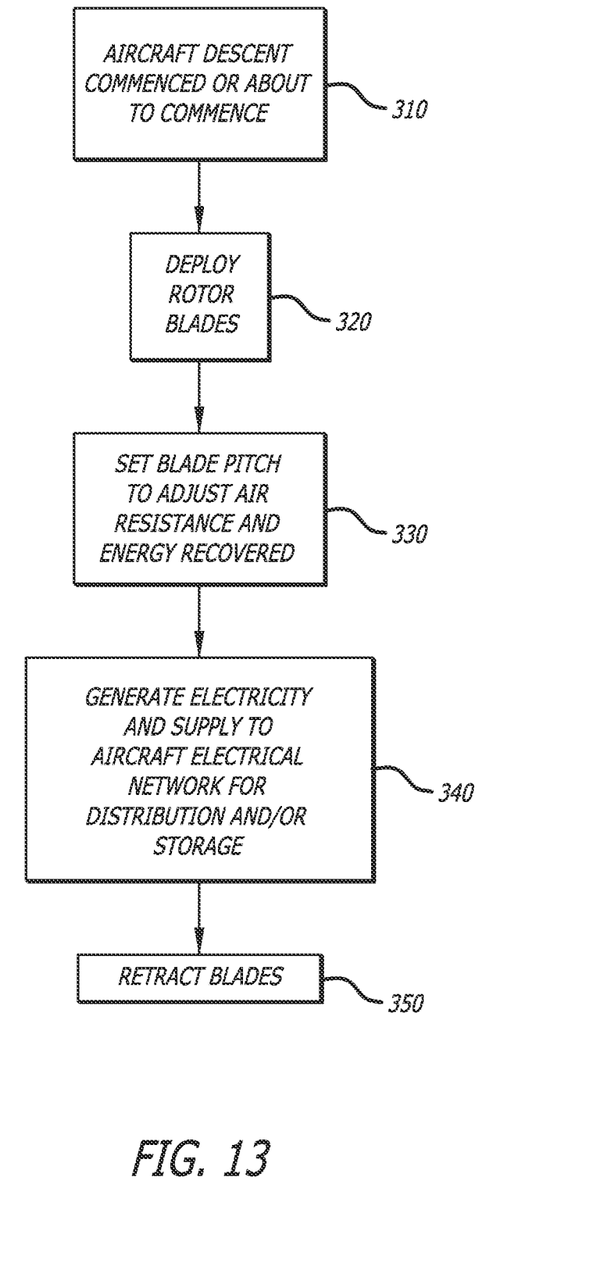
FIG. 13 is a flow chart showing the steps of a flight in which energy is recovered according to the present invention.

FIG. 13 is a flow chart showing the method steps occurring for a flight in which energy is recovered according to the present invention. In step 310, a descent phase is identified and initiated. At step 320, the rotor blades of the turbine are deployed into the airstream. The step 320 can occur before or after the descent phase has begun, but it is preferably at the same time as or after the descent has commenced. In some embodiments, the blades are deployed when the rate of descent or required slowing of the aircraft is sufficient to support energy recovery. At step 330, the pitch of the rotor blades may be used to set the drag and therefore the aerodynamic braking so as to control the speed of the aircraft. In this sense, the rotor can be used in the same way as conventional aerodynamic brakes during descent, but additionally energy is recovered. The energy of the airstream rotates the rotor blades and generates electricity, which at step 340 is fed into the aircraft electrical distribution network for powering devices or for storage. Towards the end of the descent phase, just before landing the rotor blades may be retracted, as shown at step 350. The method of FIG. 13 relates to the use of the turbine for energy recovery in descent, but the turbine could also be used during other phases of flight such as cruise and even take-off. However, during descent excess energy is being irretrievably dissipated so this is the most energy efficient time for recovery.

The person skilled in the art will readily appreciate that various modifications and alterations may be made to the above described apparatus for energy recovery and aircraft without departing from the scope of the appended claims. For example, different shapes, dimensions, numbers of rotor blades and turbines may be used. The location of the turbines around the airframe and the shape of the fairing may also be varied.

We claim:

1. An apparatus for energy recovery of an aircraft, the apparatus comprising:
   a turbine comprising a body and rotor blades, the turbine adapted for mounting to an exterior of the aircraft such that the body receives an air stream flowing at the exterior of the aircraft,
   wherein the body is located on a first end of the turbine; and
   the rotor blades selectively movable between a stowed position and a deployed position,
   wherein all of the rotor blades are mounted on a single rotatable hub located on a second end of the turbine, wherein the second end of the turbine is located opposite the first end of the turbine,
   wherein at the deployed position, the rotor blades are rotated by the air stream so as to generate electricity,
   wherein at the stowed position, the rotor blades are folded away from the body such that edges of the rotor blades meet each other to form a rear tapering fairing.

2. The apparatus of claim 1, wherein the turbine is adapted for mounting to the aircraft such that the body receives the air stream flowing at the exterior of the aircraft during all phases of flight.

3. The apparatus of claim 1, wherein the stowed position is more aerodynamically efficient for the aircraft than the deployed position.

4. The apparatus of claim 1, wherein in the stowed position, the rotor blades are hidden from the airstream by a fairing.

5. The apparatus of claim 1, wherein in the stowed position, the rotor blades are folded back from the airstream so that the rotor blades and the body together form a fairing.

6. The apparatus of claim 1, further comprising a controller for communication with the turbine and configured to control deployment of the rotor blades during flight of the aircraft.

7. The apparatus of claim 6, the controller further configured to initiate deployment of the rotor blades for descent of the aircraft and to instruct stowing of the rotor blades during at least one of take-off and cruise.

8. The apparatus of claim 6, the controller further configured to control a pitch of the rotor blades when recovering energy so as to control an amount of drag and energy recovered.

9. The apparatus of claim 1, wherein the rotor blades have a variable pitch for adjusting an amount of drag on the aircraft and an amount of energy recovered.

10. The apparatus of claim 1, wherein the turbine is mounted on one of a wing or tail assembly of the aircraft.

11. The apparatus of claim 1, wherein the turbine is mounted at a wing tip.

12. The apparatus of claim 1, wherein the turbine is mounted to the aircraft through a rotatable coupling such that the orientation of a rotor axis of the turbine is adjustable with respect to the aircraft.

13. The apparatus of claim 1, wherein the apparatus operates as an aerodynamic brake for slowing the aircraft.

14. An aircraft, the aircraft comprising:
   an apparatus for energy recovery of the aircraft, the apparatus comprising:
      a turbine comprising a body and rotor blades, the turbine adapted for mounting to an exterior of the aircraft such that the body receives an air stream flowing at the exterior of the aircraft,
      wherein the body is located on a first end of the turbine,
      wherein all of the rotor blades are mounted on a single rotatable hub located on a second end of the turbine, wherein the second end of the turbine is located opposite the first end of the turbine; and
      the rotor blades selectively movable between a stowed position and a deployed position,
      wherein at the deployed position, the rotor blades are rotated by the air stream so as to generate electricity,
      wherein at the stowed position, the rotor blades are folded away from the body such that edges of the rotor blades meet each other to form a rear tapering fairing.

15. The aircraft of claim 14, further comprising an electrical distribution network connected to the turbine and to receive energy generated from the turbine, and the aircraft further comprising energy storage devices for storing recovered energy.

16. A method of recovering energy of an aircraft, the method comprising:
   flying the aircraft,
   wherein the aircraft comprises a turbine mounted to an exterior of the aircraft to receive an air stream; and
   moving rotor blades of the turbine from a stowed position to a deployed position such that in the deployed position the rotor blades are rotated by the airstream so as to generate electricity, and
   wherein a body is located on a first end of the turbine,
   wherein all of the rotor blades are mounted on a single rotatable hub located on a second end of the turbine, wherein the second end of the turbine is located opposite the first end of the turbine,
   wherein at the stowed position, the rotor blades are folded away from the body such that edges of the rotor blades meet each other to form a rear tapering fairing.

17. The method of claim 16, further comprising adjusting a pitch of the rotor blades to set an amount of drag.

18. The method of claim 17, wherein the rotor blades of the turbine are moved to the deployed position for a descent phase of flight.

* * * * *